United States Patent
Halvarsson (10) Patent No.: US 9,537,986 B2
(45) Date of Patent: Jan. 3, 2017

(54) DYNAMIC CONTACT SHARING IN A MESH NETWORK

(71) Applicant: TERRANET AB, Lund (SE)

(72) Inventor: Stig Halvarsson, Lund (SE)

(73) Assignee: TERRANET AB, Lund (SE)

( * ) Notice: Subject to any disclaimer, the term of this patent is extended or adjusted under 35 U.S.C. 154(b) by 0 days.

(21) Appl. No.: 14/770,578

(22) PCT Filed: Feb. 26, 2014

(86) PCT No.: PCT/SE2014/050232
§ 371 (c)(1),
(2) Date: Aug. 26, 2015

(87) PCT Pub. No.: WO2014/133441
PCT Pub. Date: Sep. 4, 2014

(65) Prior Publication Data
US 2016/0006848 A1    Jan. 7, 2016

(30) Foreign Application Priority Data

Feb. 26, 2013 (SE) ...................... 1350223

(51) Int. Cl.
H04M 3/42 (2006.01)
H04M 1/2745 (2006.01)
H04W 8/00 (2009.01)
H04W 8/22 (2009.01)
H04L 29/08 (2006.01)
H04W 84/18 (2009.01)

(52) U.S. Cl.
CPC .... H04M 1/274533 (2013.01); H04L 67/1095 (2013.01); H04W 8/005 (2013.01); H04W 8/22 (2013.01); H04W 84/18 (2013.01)

(58) Field of Classification Search
CPC .......... H04M 1/274533; H04W 8/005; H04W 84/18; H04W 8/22; H04L 67/1095
See application file for complete search history.

(56) References Cited

U.S. PATENT DOCUMENTS

| 7,522,540 B1 | 4/2009 | Maufer |
| 2003/0179742 A1 | 9/2003 | Ogier et al. |
| 2007/0053308 A1 | 3/2007 | Dumas et al. |

FOREIGN PATENT DOCUMENTS

WO    2007125427 A2    11/2007

OTHER PUBLICATIONS

International Search Report and Written Opinion of PCT/SE2014/050232 mailed May 27, 2014, all enclosed pages cited.
Chapter II International Preliminary Report on Patentability of PCT/SE2014/050232 mailed Mar. 20, 2015, all enclosed pages cited.

*Primary Examiner* — Martin Mushambo
(74) *Attorney, Agent, or Firm* — Nelson Mullins Riley & Scarborough LLP (57) ABSTRACT

A network device (100, 200, 330, 340, 540) comprising a memory (240), an interface (230) and a controller (210, 410) for use in a mesh network comprising at least one another network device (540c) wherein said memory (240) is configured for storing at least one contact (560) and said controller (210, 410) is configured to: receive a contact list (560) containing at least one contact from the another network device (540) and compare the at least one received contact with the at least one contact stored in the memory (240) and if there is no match, store the received at least one contact and forward said at least one received contact.

15 Claims, 7 Drawing Sheets

DYNAMIC CONTACT SHARING IN A MESH NETWORK

TECHNICAL FIELD

This application relates to a method, a computer-readable medium and a network device for sharing of and establishing contacts, and in particular to a method, a computer-readable medium and a network device for dynamic sharing of and establishing contacts.

BACKGROUND

During extreme situations such as in disaster zones, for example after an earthquake it is of great importance that any survivors are enabled to quickly establish communication with one another. It is also of great importance that the identity of the survivors are established, and if possible, also their location.

There is thus a need for a method and a network device that enables for a fast and efficient communication network to be established and for establishing and sharing identities of users.

SUMMARY

It is an object of the teachings of this application to overcome the problems listed above by providing a network device comprising a memory, an interface and a controller for use in a mesh network comprising at least one another network device wherein said memory is configured for storing at least one contact and said controller is configured to receive a contact list containing at least one contact from the another network device and compare the at least one received contact with the at least one contact stored in the memory and if there is no match, store the received at least one contact and forward said at least one received contact.

It is also an object of the teachings of this application to overcome the problems listed above by providing a method for use in a mesh network comprising at least one network device comprising a memory, an interface and a controller for use in a mesh network comprising at least one another network device wherein said memory is configured for storing at least one contact and said method comprising receiving a contact list containing at least one contact from another network device and comparing the at least one received contact with the at least one contact stored in the memory and if there is no match, storing the received at least one contact and forwarding said at least one received contact.

It is also an object of the teachings of this application to overcome the problems listed above by providing a network device comprising a memory, an interface and a controller for use in a mesh network comprising at least one second network device wherein said memory is configured for storing at least one contact and said controller is configured to identify a contact in a traffic stream in a network to which the network device is connected to and compare the at least one identified contact with the at least one contact stored in the memory and if there is no match, store the identified at least one contact.

It is also an object of the teachings of this application to overcome the problems listed above by providing a method for use in a mesh network comprising at least one network device comprising a memory, an interface and a controller for use in a mesh network comprising at least one another network device wherein said memory is configured for storing at least one contact and said method comprising identifying a contact in a traffic stream in a network to which the network device is connected to and comparing the at least one identified contact with the at least one contact stored in the memory and if there is no match, storing the identified at least one contact.

It is also an object of the teachings of this application to overcome the problems listed above by providing a computer readable storage medium encoded with instructions that, when executed on a processor, performs the methods according to above.

The inventors of the present invention have realized, after inventive and insightful reasoning, that by utilizing the dynamic behaviour of mesh networks which may change its topology quite often and rather drastically and to combine this trait with the ability of a mobile device to roam it is possible to generate and share large contact data lists for a network device which eventually will contain most contacts in an area—even contacts that the user of the network device have never met or actively stored himself on the network device.

The teachings herein find use in routed mesh networks. The teachings herein also find use in routed mesh networks operating according to the IEEE 802.11s standard.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
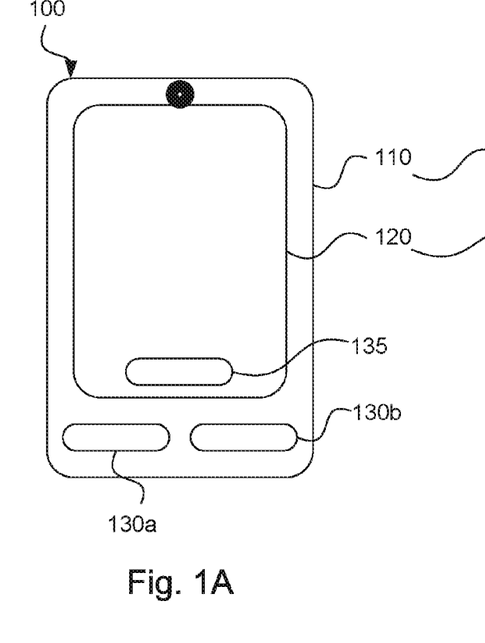
FIG. 1 is a schematic view of a network device according to an embodiment of the teachings herein.
Figure 1B:
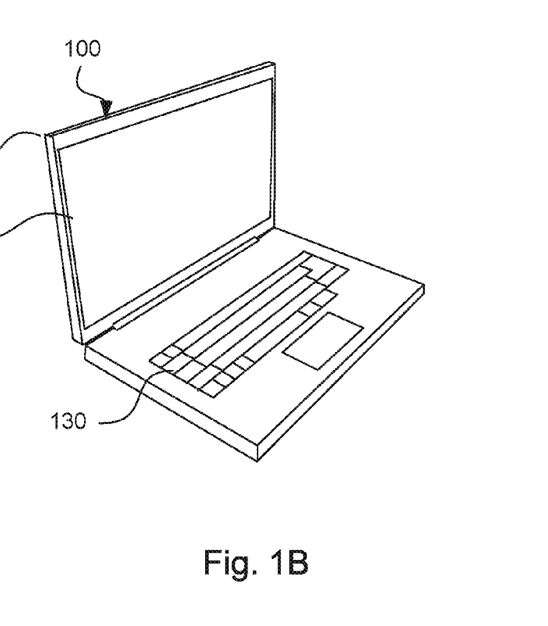

FIGS. 1A and 1B generally show a network device 100 according to an embodiment herein. In one embodiment the network device 100 is configured for network communication, either wireless or wired, for acting as a node in a mesh network. An example of a mesh network will be described with reference to FIG. 3. Examples of such a network device 100 are: a personal computer, desktop or laptop, an internet tablet, a mobile telephone, a smart phone and a personal digital assistant.

Two embodiments will be exemplified and described as being a smartphone in FIG. 1A and a laptop computer 100 in FIG. 1B.

Referring to FIG. 1A a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100.

Referring to FIG. 1B a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The network device 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a network device 100 to connect with other network devices or a server.

The network device 100 further comprises at least one input unit such as a keyboard 130. Other examples of input units are computer mouse, touch pads, touch screens or joysticks to name a few.

Figure 2:
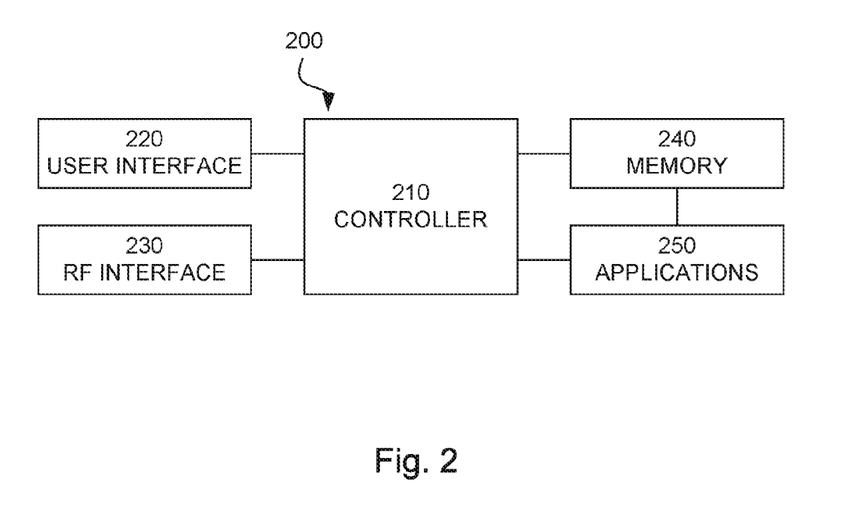
FIG. 2 is a schematic view of the components of a network device according to an embodiment of the teachings herein.

FIG. 2 shows a schematic view of the general structure of a network device according to FIG. 1. The network device 100 comprises a controller 210 which is responsible for the overall operation of the network device 200 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the network device 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the network device 200. The software modules include a real-time operating system, drivers for a user interface, an application handler as well as various applications 250. The applications are sets of instructions that when executed by the controller 210 control the operation of the network device 200. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, Short Message Service applications, location finding applications, electronic mailing and internet browsing applications.

The network device 200 may further comprise a user interface 220, which in the network device of FIGS. 1A and 1B is comprised of the display 120 and the keys 130, 135.

The network device 200 further comprises a radio frequency interface 230, which is adapted to allow the network device to communicate with other devices via a radio frequency band through the use of different radio frequency technologies. Examples of such technologies are IEEE 802.11, IEEE 802.11s and Bluetooth® to name a few. Other examples of radio technologies for example for communicating with devices outside the mesh network that may be implemented in a network device 100 are W-CDMA, GSM, UTRAN, LTE, NMT to name a few.

Figure 3:
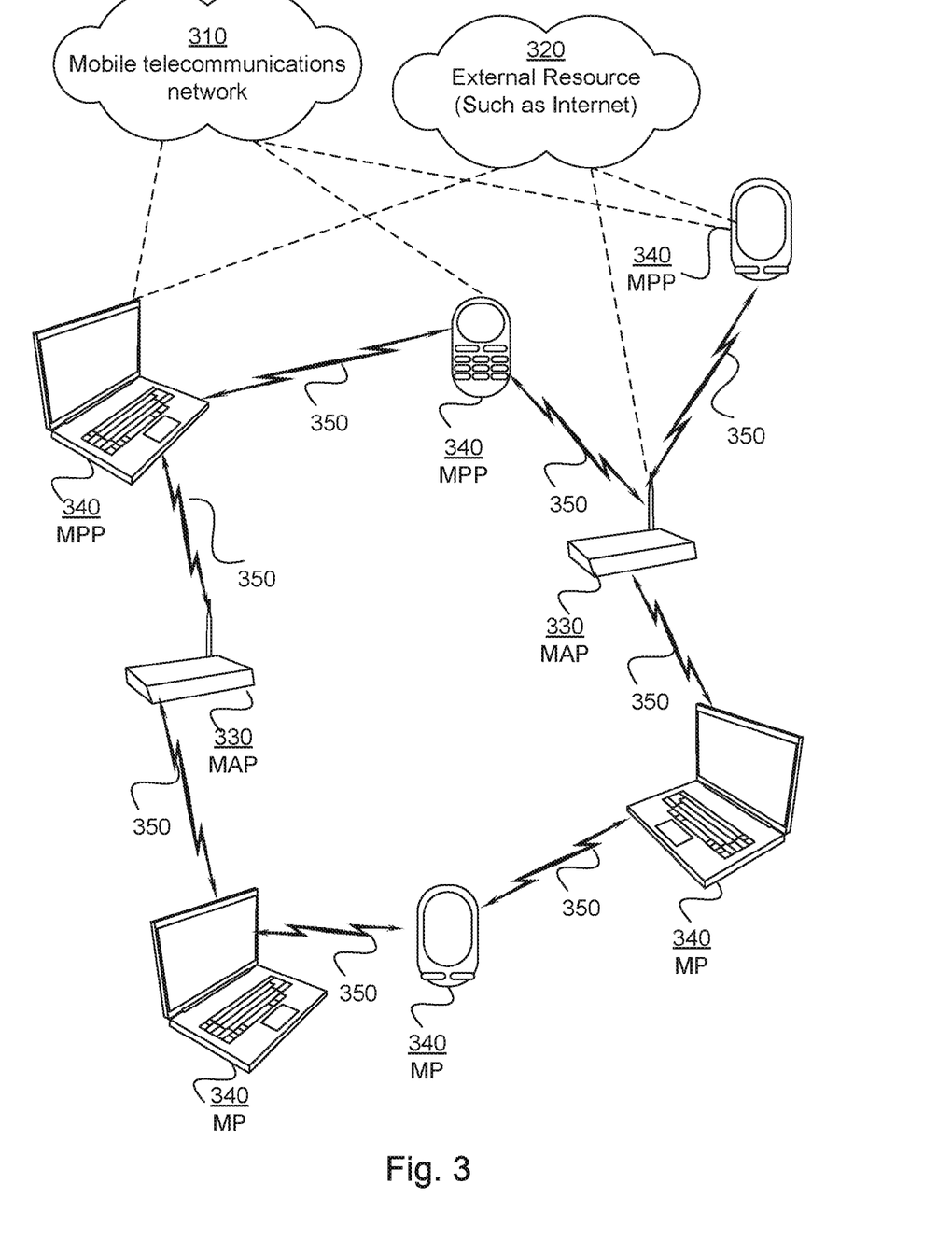
FIG. 3 is a schematic view of a general view of a data communications network according to an embodiment of the teachings herein.

FIG. 3 shows a data communication network arranged as a mesh network 300. A mesh network comprises a plurality of nodes 340 and possibly at least one access point 330, referred to as a Mesh Access Point (MAP). A network without any access points 330 is called an ad hoc network. A MAP 330 is also referred to as a node. In a mesh network 300 each node 330, 340 is configured to capture and disseminate data that is aimed for the specific node. Each node 330, 340 is also configured to serve as a relay for other nodes 340, that is, the node 340 must collaborate to propagate data in the network 300. The mesh access points 330 are configured to serve as relays and routers for the other nodes 340. The nodes 330, 340 are configured to connect to one another through links or connections 350.

The network shown in FIG. 3 is a wireless data communication network and the nodes 340 and the access points 330 (if any) are configured to establish the wireless links 350 for communicating with one another.

In this example, the mesh network is arranged to operate according to the IEEE 802.11s standard. There are three types of nodes 330, 340 in such a mesh network, namely Mesh Points (MP), Mesh Portal (MPP) and Mesh Access Points (MAP).

An MP is often a laptop, smartphone or other wireless device, such as has been disclosed in the above with reference to FIGS. 1A and 1B, and supports a peer protocol for discovering neighboring nodes and maintaining an overview of them. In IEEE 802.11s this peer protocol is called Peer Link Management protocol.

The discovery process is implemented so that a node transmits a beacon. A beacon is a data package that is transmitted periodically and carries information identifying the node transmitting it. Other data carried in the beacon includes Path Selection Protocol ID, Path Selection metric, Congestion Control Mode, Synchronization Protocol ID, Authentication Protocol ID, Mesh Formation Info and Mesh Capability. Nodes 330, 340 in a mesh network receive this information and each node 330, 340 is thus aware of its surrounding network environment.

The MPs also support a protocol for communicating with other nodes, nodes that are not necessarily neighbors to the MP. In IEEE 802.11s this peer protocol is called Hybrid Wireless Mesh Protocol (HWMP). It is hybrid because it supports two kinds of path selection protocols. In IEEE 802.11s the protocols use the MAC addresses for addressing a data package correctly. Each node 330, 340 is configured to find a path from one node 330, 340 to another node 330, 340. This is referred to as path selection.

An MPP is configured to provide gateway functionality to the mesh network. The MPP may for example be a portal to the internet 320 or a communication network 310, such as a mobile telecommunications network. An MPP must thus be configured to bridge at least two interface protocols. An MPP is often a laptop, a cell phone or other wireless device.

A MAP is an access point that is configured to also communicate according to the mesh network standard and to operate as an access point.

In the mesh network 300 of FIG. 3 there are eight nodes 330, 340 whereof three are laptops, three are smartphones and two are routers. Two nodes are MAPs, three nodes are MPs and at least two nodes are MPPs. It should be noted that a node may have the capability to act as both an MP and an MPP. For example, the MPs of the example mesh network of FIG. 3 may actually also be MPPs. For clarity issues, only three nodes are illustrated as having internet capability and three as having capabilities for mobile telecommunication.

A mesh network can be designed using a flooding technique or a routing technique. When using a routing technique, a message propagates from a sending node 340 to receiving node 340 along a path, by hopping from node 340 to node 340 until the receiving node 340 is reached. To ensure that all paths are available, a routing network must allow for continuous connections and reconfiguration around broken or blocked paths, using self-healing algorithms. According to the standard IEEE 802.11s should a path be broken this will be discovered after a time period (5 s) when a sending node detects that reception is not acknowledged. The system then performs a rerouting procedure by sending out path requests (PREM).

The self-healing capability enables a routing based network to operate when one node breaks down or a connection goes bad. As a result, the network is typically quite reliable, as there is often more than one path between a source and a destination in the network. Although mostly used in wireless scenarios, this concept is also applicable to wired networks and software interaction.

A wireless mesh network (WMN) is a communications network made up of radio nodes (laptops, cell phones and other wireless devices) while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can be implemented with various wireless technology including 802.11, 802.15, 802.16, cellular technologies or combinations of more than one type.

A wireless mesh network often has a more planned configuration, and may be deployed to provide dynamic and cost effective connectivity over a certain geographic area. An ad-hoc network, on the other hand, is formed ad hoc when wireless devices come within communication range of each other. The MAPs may be mobile, and be moved according to specific demands arising in the network. Often the MAPs are not limited in terms of resources compared to other nodes in the network and thus can be exploited to perform more resource intensive functions. In this way, the wireless mesh network differs from an ad-hoc network, since these nodes are often constrained by resources.

Figure 4:
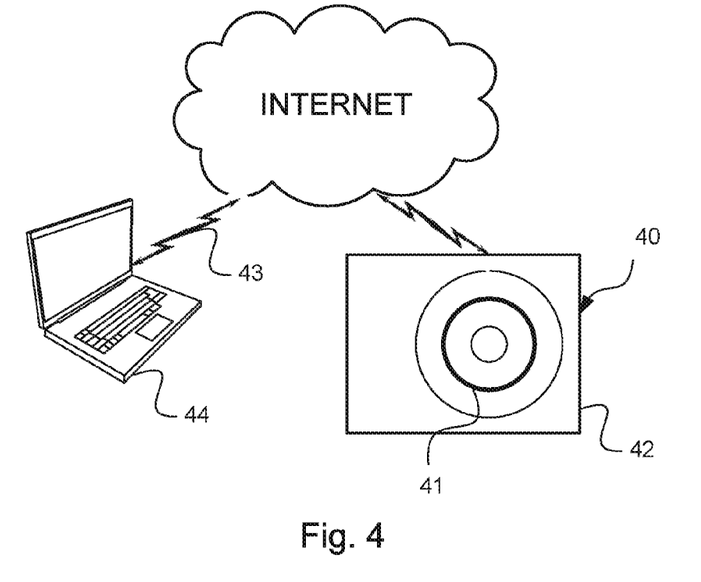
FIG. 4 is a schematic view of a computer-readable storage medium according to an embodiment of the teachings herein.

FIG. 4 shows a schematic view of a computer-readable medium as described in the above. The computer-readable medium 40 is in this embodiment a data disc 40. In one embodiment the data disc 40 is a magnetic data storage disc. The data disc 40 is configured to carry instructions 41 that when loaded into a controller, such as a processor, executes a method or procedure according to the embodiments disclosed above. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used.

The instructions 41 may also be downloaded to a computer data reading device 44, such as a computer or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a computer-readable medium 40.

The instructions may be stored in a memory (not shown explicitly in FIG. 4, but referenced 240 in FIG. 2) of the computer 44.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 6:
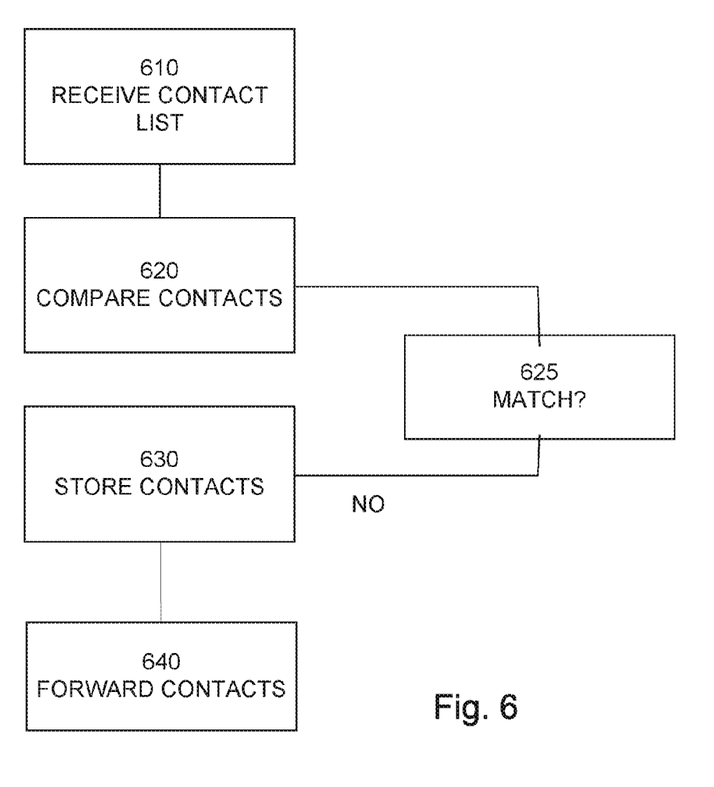
FIG. 6 is a flowchart of a general method according to an embodiment of the teachings herein.

FIG. 6 shows a flowchart of a general method according to the teachings herein for use in a mesh point (such as the network devices 100, 200, 330, 340 and 400 of FIGS. 1, 2, 3 and 4).

In the description below there will not be made any distinction between which component of a mesh point or a network device that performs which action. As would be apparent to a person skilled in data network devices some tasks may be implemented to be performed by several different components and to list all the possible alternatives would only serve to cloud the issues at hand.

FIGS. 5A, 5B, 5C and 5D show an example of a mesh network 500 arranged to operate according to herein. In the example of FIGS. 5A, 5B, 5C and 5D all network devices 540 are referenced as being Mesh Points (MP) and no difference is made between Mesh Points, Mesh Access Points and Mesh Point Portals.

Figure 5A:
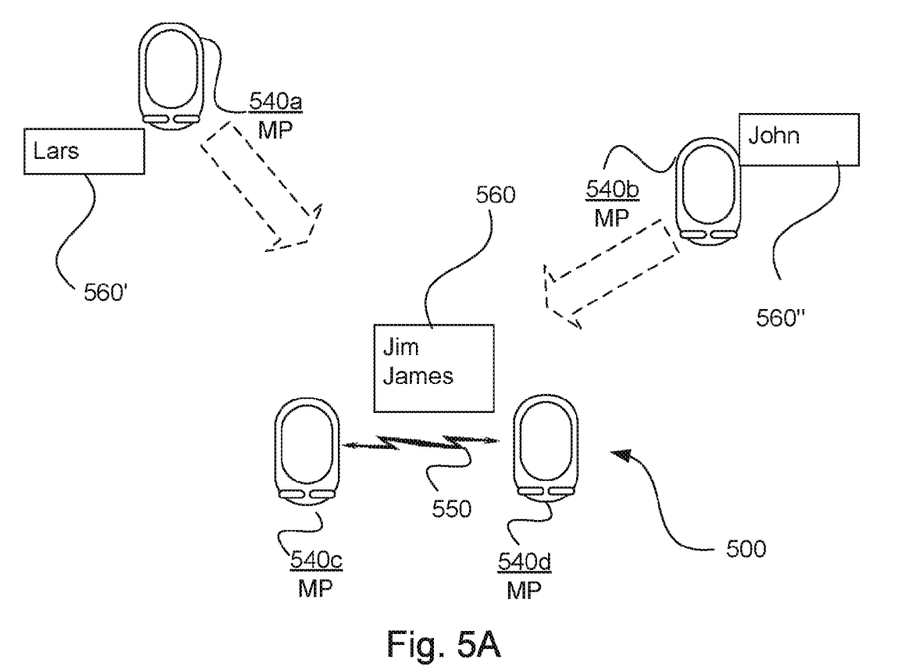
FIGS. 5A, 5B, 5C, 5D and 5E each shows an example of an example data communications network according to an embodiment of the teachings herein

FIG. 5A shows a mesh network 500 comprising two network devices 540c and 540d, such as the network device 100 of FIG. 1A (or 1B), connected via a wireless link 550 arranged to operate according to the wireless communication standard IEEE802.11s.

In one embodiment the network device 540 is a simplified version of the network device 100 specifically designed to be cheap and to be distributed possibly en-masse, at various catastrophe sites or in rural areas where the inhabitants are not able to procure network devices on their own.

In the example of FIG. 5A two network devices 540*a* and 540*b* are approaching the mesh network 500.

Each of the two approaching network devices 540*a* and 540*b* have a newly created contact list containing one contact: "Lars" for the first approaching network device 540*a* and "John" for the second approaching network device 540*b*.

The contact list of a network device may be created as per a known manner by indicating that a new contact is to be created and inputting data concerning the contact such as a name and contact details. Possibly also including a picture, an address or a last known position.

In one embodiment a network device 540 is configured for automatic creation of a contact upon start-up by a new user, whereby the new user is prompted to input data relating to the new user, such as name, address, personal identification number (such as a social security number or a birth date number). The input data is associated with contact details for the network device 540 such as an IP address, a phone number or other means of reaching the network device 540. This enables for an automatic generation of a contact list by automatically generating the first contact in the contact list upon start-up.

In one embodiment the first user is identified by the start-up routine determining if the start-up is the first start-up of the network device 540, and if so, generating the first contact. If it is determined that the start-up is not the first start-up, the network device 540 may be configured to determine if the user is a new user or not and if it is a new user generating a new contact for the new user.

The network device 540 may be arranged to determine if the user is a new user or not by prompting for a previously input identification code (such as a Personal identification Number (PIN)).

Alternatively, the network device 540 may be arranged to determine if the user is a new user or not by comparing a video stream of the user handling the network device 540 with a photograph or image stream of a registered user.

The network device 540 may be arranged to determine if the user is a new user or not by prompting the user handling the network device 540 if he is a new user or not.

In one embodiment the network device 540 is configured to forward a newly created contact to ensure that the contact list 560 is shared for all network devices 540 in the network 500. This may apply to both a contact for a new user and a contact entry being generated for a contact not being a user of the network device 540.

In the example of FIG. 5A both John and Lars have been registered as the first users of their respective network devices 540*b* and 540*a*, and the respective contact lists only contain one entry each.

To enable a simple and easy to operate manner of sharing contacts a network device 540 according to herein is configured to share its contact list upon connection with another network device, possibly for generating or joining an already existing network, possibly operating according to the communication standard 802.11s—a so-called mesh network.

In one embodiment the network device 540 is configured to share its contact list by sending it to a network device 540 through which the approaching network device 540 joins the network 500. In the example of FIG. 5A, the first approaching network device 540*a* connects with the network through a network device 540*c* and upon connection sends its contact list 560' containing "Lars" to the network device 540*c*. The receiving network device 540*c* compares the received contact list 560' with its own contact list 560 and if the received contact list 560' contains a contact that the own contact list 560 does not contain such contact is stored in the contact list 560 and forwarded to any other network device 540*d* that the receiving network device 540*c* is connected to. This enables for an efficient sharing of a contact and results in that all the network devices 540 in a network 500 has a mutually shared contact list 560. This is indicated in FIG. 5 by the shared contact list 560 belonging to the network and not any specific network device 540 in the network 500.

Figure 5B:
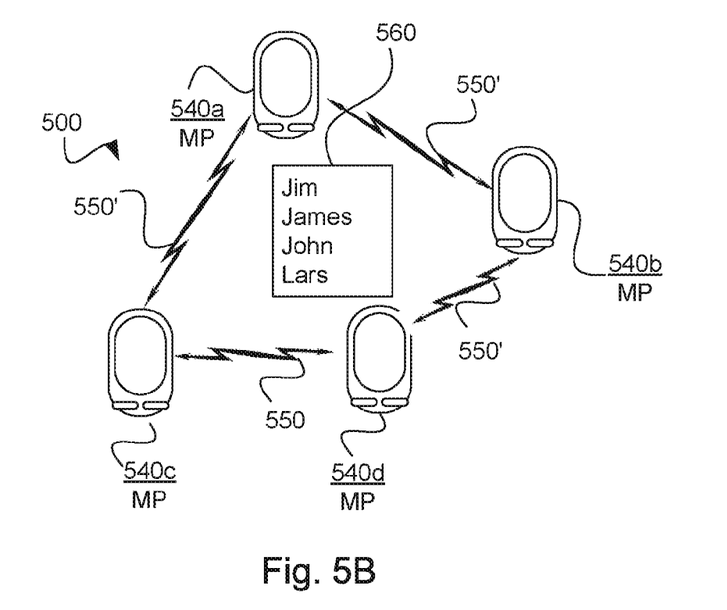

FIG. 5B shows an example network 500 where the two approaching network devices 540*a* and 540*b* has joined the network 500 and shared their contact lists to generate a commonly shared contact list 560. It should be noted that, in one embodiment, the commonly shared contact list 560 resides as a copy in each network device 540 in the network 500. Each network device 540 in the network 500 thus has a contact list 560 containing the contacts: "Jim", "James", "John" and "Lars".

The four devices have thus been able to share their contacts and expand their contact lists 560 to include all contacts in the network 500, possibly without user interaction, apart from only inputting short data regarding the user (of each network device 540) himself.

By only forwarding those contacts not already stored in the contact list 560 it is ensured that the network does not get flooded unnecessarily as an approaching network device 540 joins the network 500.

Also, if all joining network devices 540 share their contact lists 560 with the network 500 it is ensured that all network devices 540 have the same contact list.

In one embodiment the network device 540 is configured to share its contact list 560 only after user actuation or by first prompting a user and receiving an acceptance or not receiving a non-acceptance.

It should be noted that some contacts may be marked as private and such contacts are not to be shared unless explicitly shared with one or several network devices 540 through user actuation. In one embodiment some contacts may be shared but in a manner not visible to the user.

In one embodiment a receiving network device 540*c* in a network 500 is configured to share its contact list 560 with an approaching network device 540*a*. This ensures that as the approaching network device 540*a* joins or connects to the network 500 the approaching network device 540 also updates its contact list 560' with the contacts in the network contact list 560.

In one embodiment the network device 540 is configured to share its contact list by broadcasting it to the network 500 as it joins the network.

In one embodiment a network device 540 is configured to share or populate its contact list listening to network traffic in the network 500, identify contacts and store any new contact not already stored in the contact list 560'. Any newly stored contacts may be forwarded to other network devices 540 in the network 500 to ensure that all network devices 540 are informed about the contact.

By listening to traffic it is ensured that also not stored, but only mentioned contacts are identified and made part of the contact list 560.

Figure 5C:
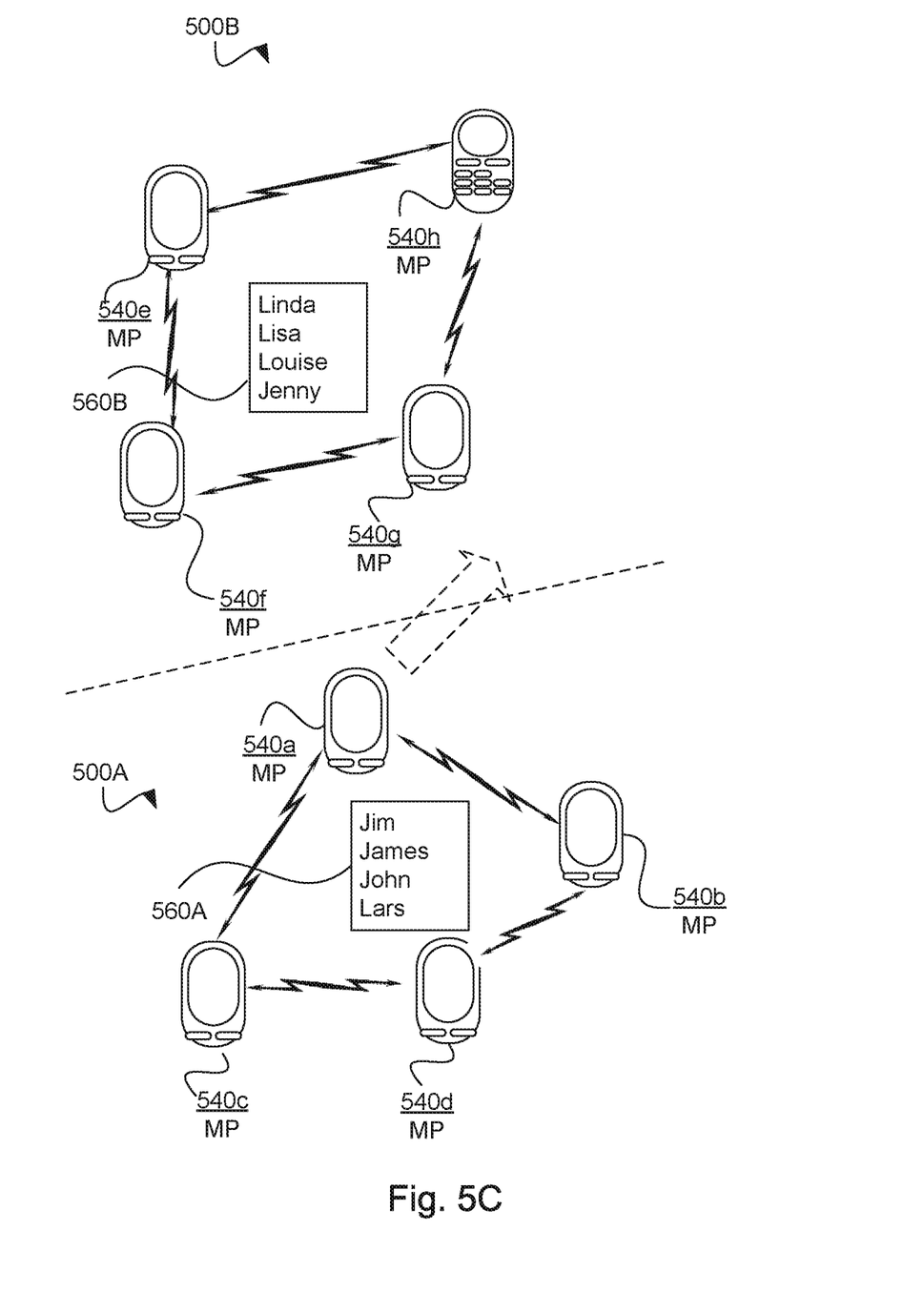

FIG. 5C shows an example situation where one network device 540*a* leaves a first network 500A, possibly by being moved (as indicated by the dashed arrow) out of range from the first network 500A, and approaches a second network 500B separated from the first network 500A (as indicated by the dashed line) by for example a distance or a structure, possibly a natural structure such as a valley or hill.

The second network 500B consists of four network devices 540e-h together sharing a contact list 560B containing the contacts: "Linda", "Lisa", "Louise" and "Jenny".

Figure 5D:
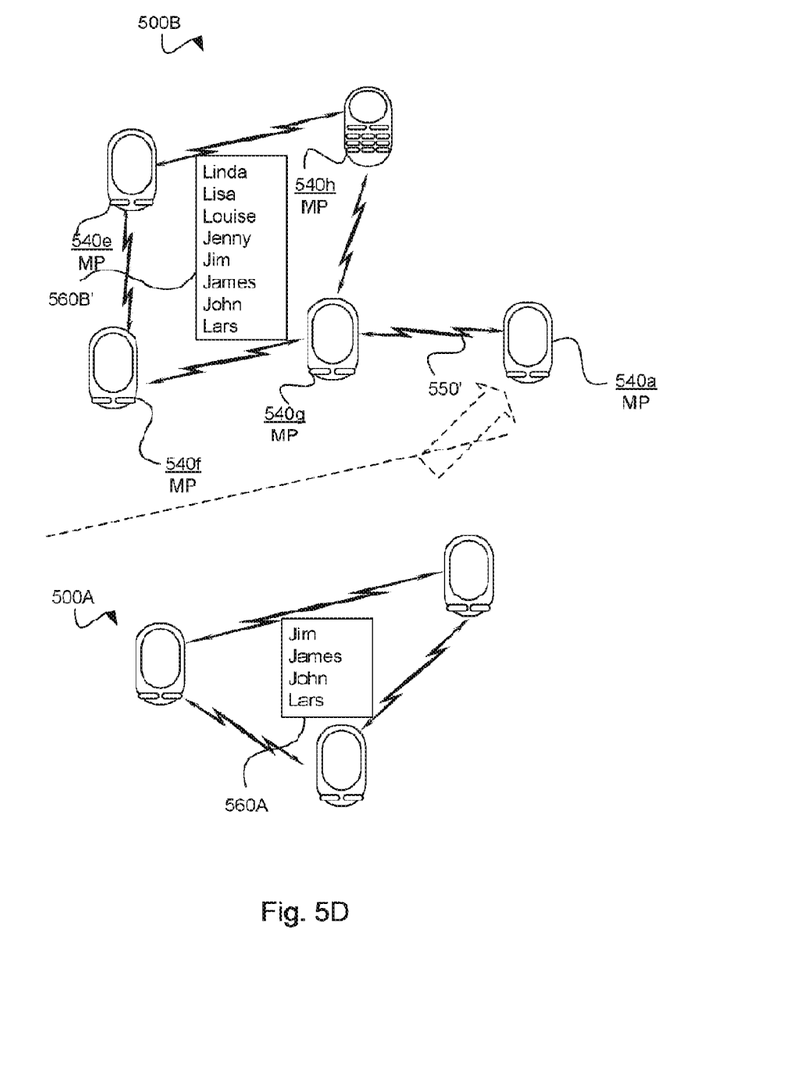

FIG. 5D shows the example situation where the network device 540a has joined the second network 500B through a new connection 550' with a receiving network device 540g. The approaching network device 540a has shared its contact list 560A with the network devices 540e-h of the second network 500B. As none of the contacts of the approaching network device's 540a contact list 560A is contained in the contact list 560B of the receiving network device 540g, the contacts of the approaching contact list 560A have been propagated to the network devices 540a-h of the second network 500B.

Also, as none of the contacts in the second network's 500B contact list 560B is contained in the approaching network device's 540a contact list 560A all those contacts have been stored in that contact list.

In one embodiment the other network devices 540e,f,h of the network 500B are configured to only receive a contact list, compare the contacts in that contact list with the contact list stored in the network device and store and forward any contact not already stored in the (local) contact list. The network devices 540 may not be configured to forward any of its own contacts—assuming that those have already been shared as the network device joined the network.

The resulting shared contact list 560B containing "Linda", "Lisa", "Louise", "Jenny", "Jim", "James", "John" and "Lars" is shared by all network devices 540a, e-h of the second network 500B.

All network devices 540a, e-h of the second network does have a contact list 560B containing contacts that they may not even have met.

As has been discussed in the above, the network device 540 is configured to forward a newly created contact to ensure that the contact list 560 is shared for all network devices 540 in the network 500. This may apply to both a contact for a new user and a contact entry being generated for a contact not being a user of the network device 540.

This enables for a rescue operator or other service operator to quickly identify survivors in or inhabitants of an area even if only one user is encountered, especially if that user has roamed or come into contact with a roaming user.

It should be noted that the list of contacts being generated according to the teachings of this application is not a list of available contacts in a network, but a list of contacts known to all network devices in the network, which includes the contacts known to all network devices also in previous other networks.

Figure 5E:
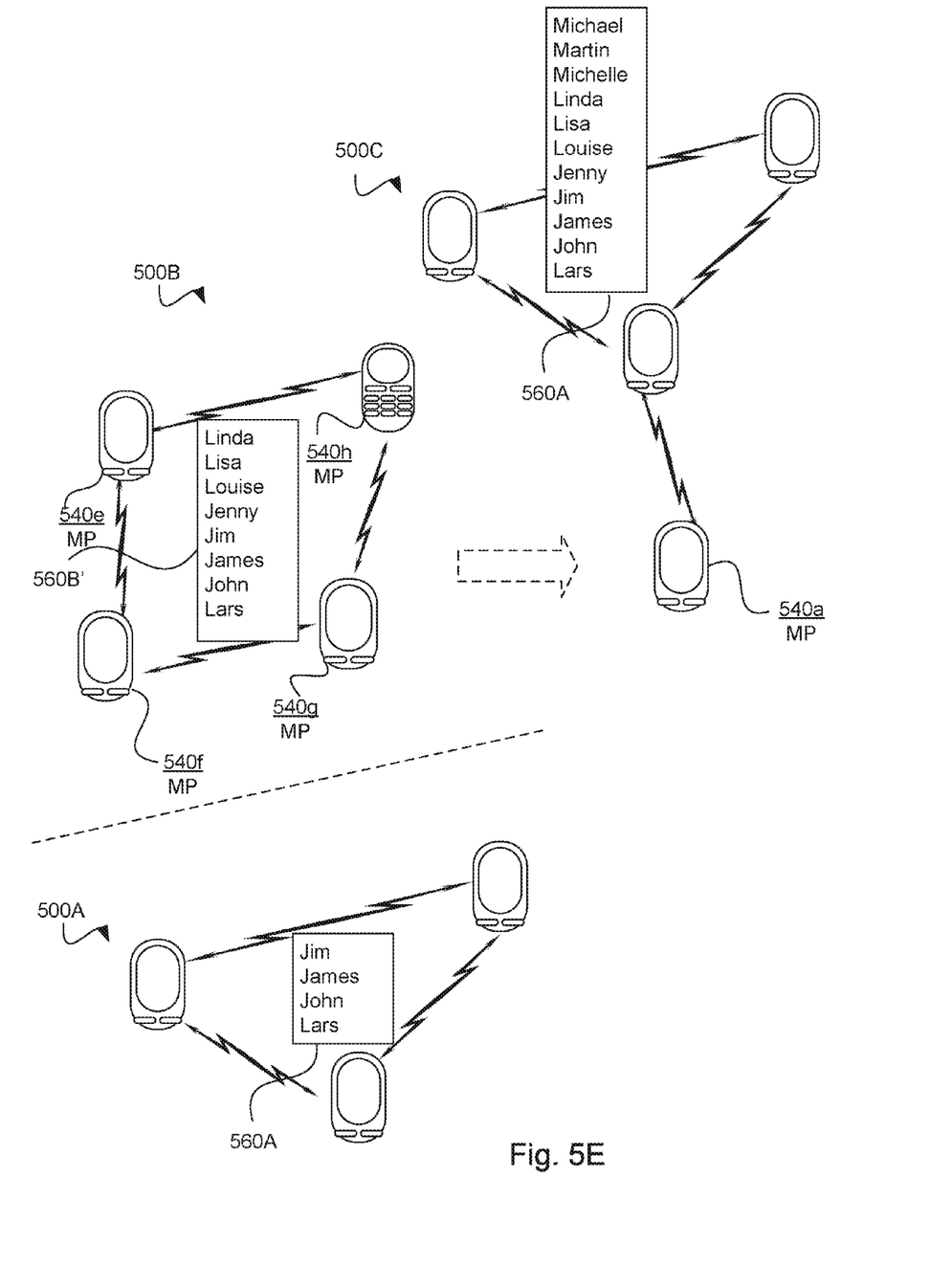

To further illustrate the benefits of the teachings herein an example where the network device joins a third network 500C will be discussed. FIG. 5E shows an example situation where one network device 540a leaves the second network 500B and joins a third network 500C. The third network 500C contains three network devices and the contacts Michelle, Martin and Michael. As the first network device 540a joins the network, the contact lists of the network devices in the third network 500C are combined with the contact list of the first network device 540a and all contact lists now include the contacts Michael, Martin, Michelle, Linda, Lisa, Louise, Jenny, Jim, James, John and Lars. It should be noted that the resulting contact list would be the same regardless which network device that left the second network 500B to join the third network 500C. This will enable rescue personnel to contact network devices that are in the first network 500a even if they encounter a user (or network device) that has never even been part of the first network 500A.

In the description above the network devices 540 included in the sharing of contacts have been referred to as the approaching and receiving network devices 540. It should be noted that from the perspective of either network device, the other network device is seen as another network device.

Also, if the contact data includes a last known position of a contact, such contact may more easily be localized as a starting point for a possible search is known.

The teachings herein will now be summarized through a general method according to one embodiment of the teachings herein. FIG. 6 shows a flowchart of one such method. A network device receives 610 a contact list containing at least one contact from another network device and compares 620 the at least one received contact with the at least one contact stored in the memory and if there is no match, storing 630 the received at least one contact and forwarding 640 said at least one received contact.

One benefit of the teachings herein is that a contact list is quickly and efficiently built even with minimal user interaction. The contact list may also contain contacts that a user has never met which increases the visibility of the contacts.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A network device comprising a memory, an interface and a controller for use in a mesh network comprising said network device, being configured to operate as a first network device, and a second network device, wherein said memory is configured for storing at least one contact, said contact comprising a telephone number and said controller is configured to:
    receive a contact list containing at least one contact from the second network device when it is determined that the second network device is attempting to connect to the mesh network to which the first network device is part of, and
    compare all of the at least one received contact with all of the at least one contact stored in the memory and if there is no match for at least one of the at least one received contacts, store the received at least one contact for which there was no match in said memory and
    determine if the mesh network comprises a third network device, and if so, forward any received contact for which there was no match to said third network device, and wherein said controller is further configured to transmit the at least one contact stored in the memory to said second device.

2. The network device of claim 1, wherein said controller is further configured to
    identify at least one contact in a traffic stream in the mesh network to which the first network device is connected to and
    compare the at least one identified contact with the at least one contact stored in the memory and if there is no match, store the identified at least one contact for at least one of the at least one identified contacts and
    determine if the mesh network comprises a third network device, and if so, forward the identified at least one contact for at least one of the at least one identified contacts to said third network device.

3. The network device of claim 1, wherein said controller is further configured to
determine that the first network device is being used for the first time by a user and in response thereto
prompt for and receive data relating to the user and in response thereto generate and store a contact in the memory based on the received data.

4. The network device of claim 3, wherein said controller is further configured to determine that the first network device is being used for the first time by a user by determining if a start-up is the first start-up of the first network device, and if so, generating a first contact.

5. The network device of claim 4, wherein said controller is further configured to determine that the first network device is being used for the first time by a user by
determining if the user is a new user or not and if it is a new user generating a new contact for the new user, whereby said controller is configured to determine if the user is a new user by
prompting for an identification code and/or
by comparing a video stream of the user handling the first network device with a photograph or image stream of a registered user.

6. The network device of claim 3, wherein said controller is further configured to determine that the first network device is being used for the first time by a user by
determining if the user is a new user or not and if it is a new user generating a new contact for the new user, whereby said controller is configured to determine if the user is a new user by
prompting for an identification code and/or
by comparing a video stream of the user handling the first network device with a photograph or image stream of a registered user.

7. The network device of claim 1, wherein said controller is further configured to forward a generated contact to said second network device and if the network comprises said third network device, the controller is further configured to forward the generated contact to said third network device.

8. The network device of claim 1, wherein the first network device is configured to communicate with the second network device through a radio interface and if the network comprises said third network device, the controller is further configured to communicate with said third network through a the radio interface.

9. The network device of claim 8, wherein said radio interface is configured to operate according to the standard IEEE 802.11s.

10. Method for use in a mesh network comprising at least one first network device comprising a memory, an interface and a controller for use in a mesh network comprising said first network device and a second network device wherein said memory is configured for storing at least one contact, said contact comprising a telephone number and said method comprising:
receiving a contact list containing at least one contact from said second network device when it is determined that the second network device is attempting to connect to the mesh network to which the first network device is part of, and
comparing all of the at least one received contact with all of the at least one contact stored in the memory and if there is no match for at least one of the at least one received contacts, storing the received at least one contact for which there was no match in said memory and
determining if the mesh network comprises a third network device, and if so, forwarding any at least one received contact for which there was no match to said third network device and transmitting the at least one contact stored in the memory to said second device.

11. A non-transitory computer readable storage medium encoded with instructions that, when executed on a processor, performs the method according to claim 10.

12. A network device being configured to operate as a first network device comprising a memory, an interface and a controller for use in a mesh network comprising at least one second network device wherein said memory is configured for storing at least one contact and said controller is configured to:
identify at least one contact in a traffic stream in a network to which the first network device is connected to and
compare all of the at least one identified contact with all of the at least one contact stored in the memory and if there is no match for at least one of the at least one identified contacts, store this identified at least one contact for which there was no match in the memory.

13. The network device according to claim 12, wherein the mesh network comprises a third network device, and wherein the controller is further configured to forward the identified at least one contact for which there was no match to said third network device.

14. Method for use in a mesh network comprising at least one first network device comprising a memory, an interface and a controller for use in a mesh network comprising at least one second network device wherein said memory is configured for storing at least one contact and said method comprising:
identifying at least one contact in a traffic stream in a network to which the first network device is connected to and
comparing all of the at least one identified contact with all of the at least one contact stored in the memory and if there is no match for at least one of the at least one identified contacts, storing the identified at least one contact for which there was no match in the memory.

15. A non-transitory computer readable storage medium encoded with instructions that, when executed on a processor, performs the method according to claim 14.

* * * * *